(12) United States Patent
Sama et al.

(10) Patent No.: US 11,698,671 B2
(45) Date of Patent: Jul. 11, 2023

(54) PEAK POWER MANAGEMENT FOR PROCESSING UNITS

(71) Applicant: Apple Inc., Cupertino, CA (US)

(72) Inventors: Preethi Bhargavi Sama, San Jose, CA (US); Richard H. Larson, Saratoga, CA (US); Shih-Chieh Wen, San Jose, CA (US); Srikanth Balasubramanian, Los Altos, CA (US)

(73) Assignee: Apple Inc., Cupertino, CA (US)

( * ) Notice: Subject to any disclaimer, the term of this patent is extended or adjusted under 35 U.S.C. 154(b) by 0 days.

(21) Appl. No.: 17/481,703

(22) Filed: Sep. 22, 2021

(65) Prior Publication Data

US 2023/0092988 A1 Mar. 23, 2023

(51) Int. Cl.
*G06F 1/32* (2019.01)
*G06F 1/3234* (2019.01)

(52) U.S. Cl.
CPC .................. *G06F 1/3234* (2013.01)

(58) Field of Classification Search
CPC ........................................................ G06F 1/32
See application file for complete search history.

(56) References Cited

U.S. PATENT DOCUMENTS

| 6,564,328 | B1 * | 5/2003 | Grochowski | G06F 9/3836 |
| | | | | 713/320 |
| 7,533,003 | B2 * | 5/2009 | Floyd | G06F 11/348 |
| | | | | 702/186 |
| 9,195,291 | B2 | 11/2015 | Lee | |
| 9,383,806 | B2 | 7/2016 | Lien et al. | |
| 2015/0089251 | A1 * | 3/2015 | Carlson | G06F 1/28 |
| | | | | 713/300 |
| 2017/0192477 | A1 * | 7/2017 | Lefurgy | G06F 1/3296 |
| 2017/0331293 | A1 * | 11/2017 | Narla | H02J 3/381 |

\* cited by examiner

*Primary Examiner* — Paul B Yanchus, III
(74) *Attorney, Agent, or Firm* — Sterne, Kessler, Goldstein & Fox P.L.L.C.

(57) ABSTRACT

Some aspects of this disclosure relate to a peak power manager that includes a first power estimate accumulator circuit configured to receive one or more power estimates associated with one or more subsystems and to generate a first accumulated power estimate. The peak power manage can further include a first-in first-out (FIFO) storage circuit configured to store a plurality of first accumulated power estimates associated with a plurality of clock cycles corresponding to a moving time interval window. The peak power manager can further include a second power estimate accumulator circuit configured to accumulate the plurality of first accumulated power estimates to generate a second accumulated power estimate and a control circuit. The control circuit can be configured to compare the second accumulated power estimate with a threshold power and generate a control signal to control one or more events at the one or more subsystems in response to the second accumulated power estimate satisfying a condition associated with the threshold power.

20 Claims, 8 Drawing Sheets

PEAK POWER MANAGEMENT FOR PROCESSING UNITS

BACKGROUND

Field

This disclosure generally relates to techniques for implementing peak power management.

Related Art

A processing unit (e.g., a central processing unit (CPU)) can use power management techniques to control its powers and reduce the amount of heat the CPU generates. In some examples, the power management techniques can include dynamic frequency scaling and/or dynamic voltage scaling. The power management techniques can help preserving battery on, for example, user devices (e.g., mobile devices). Additionally, or alternatively, the power management techniques can be used to reduce noise and/or cooling costs on the user devices. Some power management techniques can take several cycles (e.g., 70-90 clock cycles—e.g., 20-25 ns depending on clock frequency and type of event) to control the power in the CPU. The time used by the power management techniques can be larger than the time needed for some systems. For example, some systems cannot support transients that are greater than, for example, 10 ns.

SUMMARY

Some aspects of this disclosure include apparatuses and methods for implementing peak power management techniques. For example, some aspects of this disclosure are directed to peak power management techniques to address the problems discussed above. According to some aspects, a static peak power manager is disclosed that can employ direct instruction type based peak power management. Additionally, or alternatively, the static peak power manager of this disclosure can continuously (or substantially continuously) scan peak power across one or more cycle windows.

Some aspects of this disclosure relate to a peak power manager that includes a first power estimate accumulator circuit configured to receive one or more power estimates associated with one or more subsystems and to generate a first accumulated power estimate. The peak power manage can further include a first-in first-out (FIFO) storage circuit configured to store a plurality of first accumulated power estimates associated with a plurality of clock cycles corresponding to a moving time interval window. The peak power manager can further include a second power estimate accumulator circuit configured to accumulate the plurality of first accumulated power estimates to generate a second accumulated power estimate and a control circuit. The control circuit can be configured to compare the second accumulated power estimate with a threshold power and generate a control signal to control one or more events at the one or more subsystems in response to the second accumulated power estimate satisfying a condition associated with the threshold power.

In some aspects, the first power estimate accumulator circuit can be configured to generate the first accumulated power estimate from the one or more power estimates over a clock cycle. The second power estimate accumulator circuit can be configured to accumulate the plurality of first accumulated power estimates over the plurality of clock cycles corresponding to the moving time interval window.

In some aspects, the peak power manager can further include one or more multiplier circuits. Each of the one or more multipliers is configured to multiply each of one or more power indicators from a corresponding one of the one or more subsystems by a corresponding weight to generate a corresponding one of the one or more power estimates.

In some aspects, the peak power manager can further include a leakage consumption accumulator circuit configured to receive one or more leakage consumptions from the one or more subsystems and generate a total leakage consumption. The peak power manager can further include a second control circuit configured to compare the total leakage consumption with one or more leakage thresholds and to determine one or more parameters for the peak power manager based on the comparison. In some aspects, the one or more parameters for the peak power manager include the threshold power. In some aspects, each of the one or more leakage consumptions is determined based on a temperature of a corresponding one of the one or more subsystems.

In some aspects, the control circuit is configured to retrieve the threshold power from a memory, where the threshold power is based on a performance state of the one or more subsystems.

In some aspects, the control circuit can be further configured to receive one or more weights and a second threshold and compare the one or more weights with the second threshold. In response to the one or more weights satisfying a first condition associated with the second threshold, the control circuit can be configured to pass the control signal to the one or more subsystems to control the one or more events at the one or more subsystems. In response to the one or more weights satisfying a second condition associated with the second threshold, the control circuit can be configured to block the control signal to the one or more subsystems.

In some aspects, the peak power manager can further include a preemptive mitigation circuit configured to receive the second accumulated power estimate accumulated over the plurality of clock cycles and dynamically generate the threshold power.

Some aspects of this disclosure relate to a method including receiving, by a first power estimate accumulator circuit of a peak power manager, one or more power estimates associated with one or more subsystems and generating, by the first power estimate accumulator circuit, a first accumulated power estimate. The method can further include storing, using a first-in first-out (FIFO) storage circuit of the peak power manager, a plurality of first accumulated power estimates associated with a plurality of clock cycles corresponding to a moving time interval window. The method can also include accumulating, by a second power estimate accumulator circuit of the peak power manager, the plurality of first accumulated power estimates to generate a second accumulated power estimate. The method can further include comparing the second accumulated power estimate with a threshold power and generating a control signal to control one or more events at the one or more subsystems in response to the second accumulated power estimate satisfying a condition associated with the threshold power.

Some aspects of this disclosure relate to a non-transitory computer-readable medium storing instructions that when executed by a processor, cause the processor to perform operations including receiving one or more power estimates associated with one or more subsystems and generating a first accumulated power estimate from the one or more power estimates over a clock cycle. The operations can further include storing a plurality of first accumulated power estimates associated with a plurality of clock cycles corresponding to a moving time interval window. The operations can further include accumulating the plurality of first accumulated power estimates to generate a second accumulated power estimate over the plurality of clock cycles corresponding to the moving time interval window. The operations can further include comparing the second accumulated power estimate with a threshold power and generating a control signal to control one or more events at the one or more subsystems in response to the second accumulated power estimate satisfying a condition associated with the threshold power.

This Summary is provided for purposes of illustrating some aspects of this disclosure to provide an understanding of the subject matter described herein. Accordingly, the above-described features are examples and should not be construed to narrow the scope or spirit of the subject matter in this disclosure. Other features, aspects, and advantages of this disclosure will become apparent from the following Detailed Description, Figures, and Claims.

BRIEF DESCRIPTION OF THE FIGURES

The accompanying drawings, which are incorporated herein and form part of the specification, illustrate the present disclosure and, together with the description, further serve to explain the principles of the disclosure and enable a person of skill in the relevant art(s) to make and use the disclosure.

The present disclosure is described with reference to the accompanying drawings. In the drawings, generally, like reference numbers indicate identical or functionally similar elements. Additionally, generally, the left-most digit(s) of a reference number identifies the drawing in which the reference number first appears.

DETAILED DESCRIPTION

Some aspects of this disclosure include apparatuses and methods for implementing peak power management techniques. According to some aspects, a static peak power manager is disclosed that can employ direct instruction type based peak power management. Additionally, or alternatively, the static peak power manager of this disclosure can continuously (or substantially continuously) scan peak power across one or more cycle windows.

Figure 1:
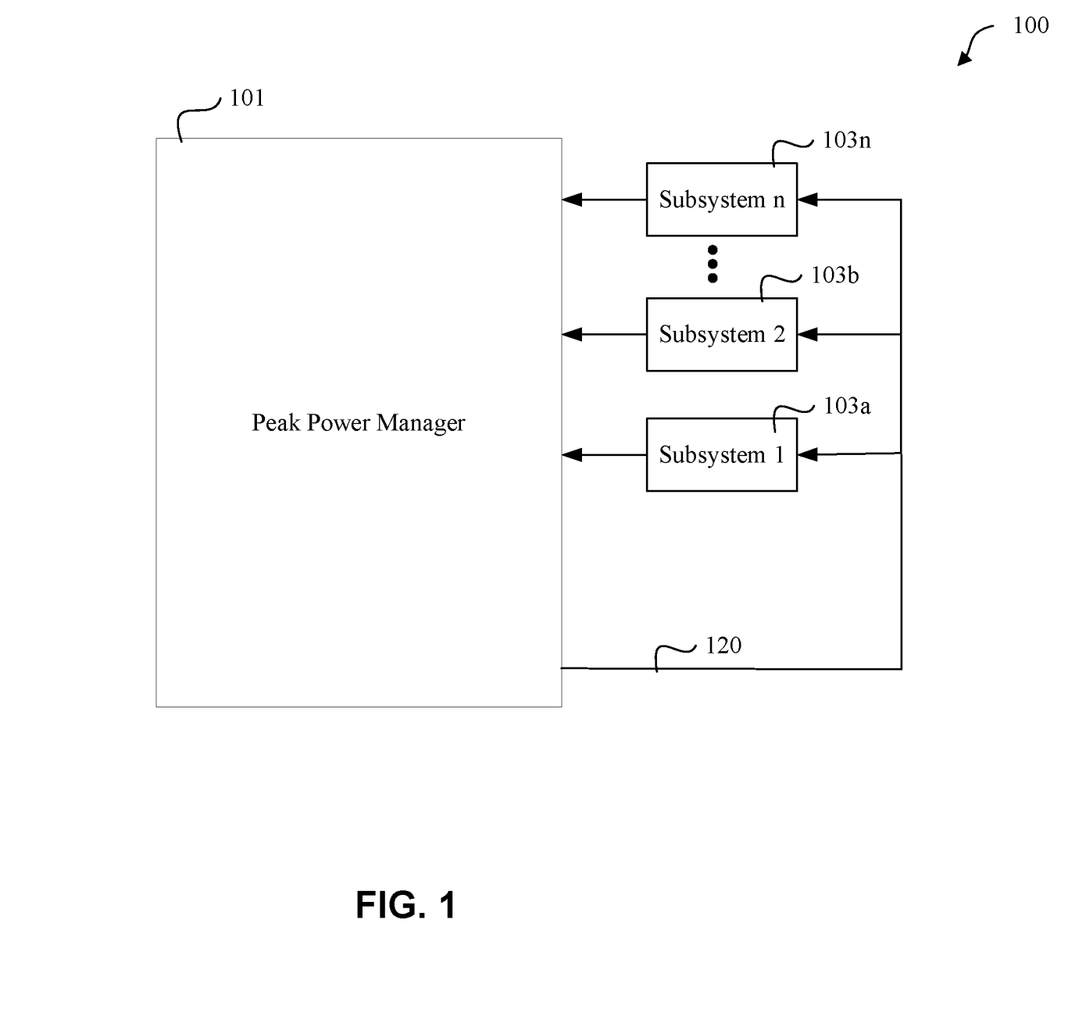
FIG. 1 illustrates an example system implementing peak power management, according to some aspects of the disclosure.

FIG. 1 illustrates an example system 100 implementing peak power management, according to some aspects of this disclosure. Example system 100 is provided for the purpose of illustration only and does not limit the disclosed aspects. System 100 may include, but it not limited to, subsystems 103a-103n (also collectively referred to herein as subsystem 103 or a plurality of subsystems 103) and peak power manager 101.

According to some aspects, system 100 can be part of one or more electronic devices such as, but not limited to, wireless communication devices, smart phones (e.g., user equipment), laptops, desktops, tablets, personal assistants, monitors, multimedia devices (e.g., televisions), human interface devices, speaker devices, headphone devices, wearable devices, medical sensors, gaming devices, vehicle multimedia centers, Internet-of Things (IoT) devices, and the like.

According to some aspects, subsystems 103 can be part of one or more processor cores.

For example, subsystems 103 can be part of one or more processors, processor cores, execution units, etc. on a system-on-a-chip (SoC). According to some aspects, the output of subsystems 103 can include a number of issued instructions in each subsystem 103. In some examples, the number of issued instructions can indicate the amount of activity generated in each subsystem 103. Although some examples are discussed with respect to the number of issued instructions, other measures can be used as an indicator of the amount of activity generated in each subsystem 103 and therefore, as an indicator of the power consumed by each subsystem 103. For example, one measure for indicating the power consumed by subsystem 103 can include the number of event(s) occurring on subsystem 103.

In some examples, the instructions issued in subsystem 103 can include high power instructions. High power instructions may include one or more instructions from a set of instructions supported by a processor that have been previously identified as generating high power consumption during execution. For example, a floating-point (FP), single-instruction-multiple-data (SIMD) instruction type may have wide data lanes for processing vector elements during a multi-cycle latency. Data transitions on such wide data lanes may contribute to high switching power during the execution of such an instruction.

According to some aspects, subsystem 103 can send its corresponding indicator of the power consumed by subsystem 103 to peak power manager 101. The indicator can include information regarding the power consumed by subsystem 103. For example, as discussed above, the indicator can include, but is not limited to, the number of instructions (e.g., high power instructions) issued in each subsystem 103. Peak power manager 101 can use the received indicators to estimate the power consumed by one or more of subsystems 103. Based on the power estimate, peak power manager 101 can limit the number of instructions (e.g., high power instructions) being issued in subsystems 103.

Figure 2:
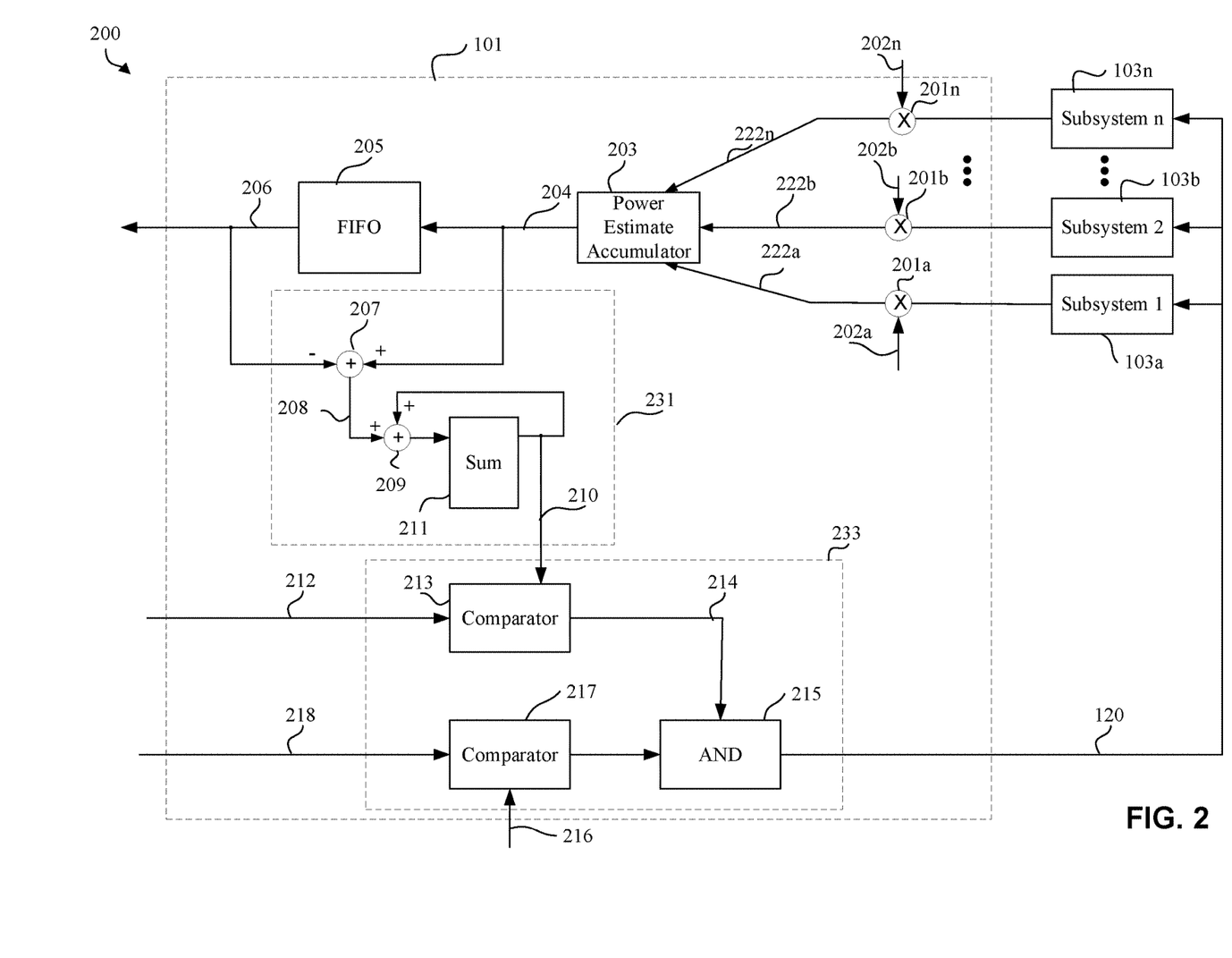
FIG. 2 illustrates an exemplary implementation of a peak power manager, according to some aspects of the disclosure.

As discussed in more detail with respect to FIG. 2, peak power manager 101 can be a peak power manager circuit that can include one or more circuits configured to determine a power estimate for each clock cycle to estimate the power consumed by one or more of subsystems 103 during that clock cycle. Peak power manager 101 can use a moving window (e.g., a moving time interval window using a first-in first-out (FIFO) storage device/circuit) to determine an accumulation of a number of power estimates over a number of clock cycles. Peak power manager 101 can compare the accumulated power estimates with a threshold power (e.g., an available budget). If the accumulated power estimate satisfies a condition (e.g., the accumulated power estimate is greater than the threshold power), peak power manager 101 can generate control signal 120 to limit the number of instructions (e.g., high power instructions) being issued in subsystems 103.

According to some aspects, peak power manager 101 performs its peak power management operations without measuring the amount of currents in subsystems 103a-103n. In contrast, peak power manager 101 can determine the accumulated power estimate and determine whether the accumulated power estimate satisfies a condition or not. Based on these determinations, peak power manager 101 can generate control signal 120 to, for example, limit the number of instructions being issued in subsystems 103. In other words, instead of measuring absolute values, peak power manager 101 can measure and use relative power for its peak power management operations, according to some aspects.

According to some aspects, the operation of peak power manager 101 can involve looking up instructions by instruction types or instruction sub-types. In some examples, the number of classes can be kept to a minimum number to avoid a large latency. According to some examples, a weight (as a non-limiting example, a 2 bits weight) can be associated with each of the instruction sub-types that can categorize the relative power of that instruction sub-type to a largest power class. In this example, peak power manager 101 can measure the relative power in each clock cycle (e.g., instead of absolute power). The power can be relative to a threshold power (e.g., an available budget). In a non-limiting example, peak power manager 101 can measure the relative power as a percentage of the threshold power.

At the end of each clock cycle, peak power manager 101 can rotate the power estimate (for subsystems 103) through, for example, an n-entry FIFO (e.g., FIFO storage device/circuit). Peak power manager 101 can use the accumulated power estimate accumulated over a number of clock cycles (e.g., corresponding to a moving time interval window) to generate control signal 120 to limit the number of instructions (e.g., high power instructions) being issued in subsystems 103.

According to some aspects, peak power manager 101 can receive and/or retrieve one or more thresholds from a table (e.g., a Dynamic Voltage Frequency Management (DVFM) table) to determine whether or not peak power manager 101 will perform its peak power management techniques. In some examples, the threshold can be subsystem and/or state specific as the threshold can depend on voltage(s), frequenc(ies), number of cores, etc. In this example, peak power manager 101 can receive or retrieve one or more weights that indicate information associated with the activity of one or more subsystems 103. Peak power manager 101 can compare the one or more weights with the threshold from the table. If the one or more weights satisfy a condition (e.g., the one or more weights are less than or equal to the threshold), peak power manager 101 can perform its peak power management techniques. Otherwise, peak power manager 101 can refrain from performing its peak power management techniques. In this example, peak power manager 101 can perform its operation for specific subsystems (e.g., subsystems with high performance states). In other words, peak power manager 101 can first determine if subsystems 103 are at risk of exceeding a peak power or not before peak power manager 101 can perform its operation.

According to some examples, state as discussed herein can refer to the amount of logic that is enabled in one or more of subsystems 103a-130n. For example, a high performance state can refer to subsystems 103a-130n with high amount of logic enabled. For example, a low performance state can refer to subsystems 103a-130n with low amount of logic enabled. Subsystem(s) in the high performance state can in the risk of exceeding the peak power. In some examples, the state can also include the voltage and/or frequency associated with one or more of subsystems 103a-130n.

FIG. 2 illustrates an example system 200 including peak power manager 101, according to some aspects of this disclosure. Example system 200 is provided for the purpose of illustration only and does not limit the disclosed aspects. System 200 may include, but it not limited to, subsystems 103a-103n and peak power manager 101. Subsystems 103a-103n and peak power manager 101 are similar to subsystems 103a-103n and peak power manager 101 of FIG. 1. According to some aspects, peak power manager 101 is a static peak power manager.

FIG. 2 further illustrates an exemplary implementation of peak power manager 101, according to some aspects. Peak power manager 101 can include other and/or additional circuits for implementing peak power management techniques of this disclosure.

As discussed above, peak power manager 101 can receive, from one or more subsystems 103, one or more corresponding indicators of the power consumed by subsystem 103, according to some aspects. The indicator can include information regarding the power consumed by subsystem 103. For example, as discussed above, the indicator can include, but is not limited to, the number of instructions (e.g., high power instructions) issued in each subsystem 103. Peak power manager 101 can use the received indicators to estimate the power consumed by one or more of subsystems 103. In some examples, in order to generate the power estimate for each subsystem, the indicator from each subsystem is multiplied by a corresponding weight. For example, for subsystem 103a, the indicator (e.g., the number of instructions) associated with subsystem 103a is multiplied, using multiplier circuit 201a, with weight 202a to generate power estimate 222a. For example, for subsystem 103b, the indicator (e.g., the number of instructions) associated with subsystem 103b is multiplied, using multiplier circuit 201b, with weight 202b to generate power estimate 222b. For example, for subsystem 103n, the indicator (e.g., the number of instructions) associated with subsystem 103n is multiplied, using multiplier circuit 201n, with weight 202n to generate power estimate 222n. According to some aspects, weights 202a-202n can be stored in a memory (e.g., the DVFM table). Peak power manager 101 can retrieve weights 202a-202n from the memory. In some examples, weights 202a-202n can be subsystem and/or state specific as the weights 202a-202n can depend on voltage(s), frequenc(ies), number of cores, types/sub-types of instructions, etc.

According to some aspects, power estimates 222a-222n are accumulated using power estimate accumulator circuit 203 to generate accumulated power estimate 204. In some aspects, power estimate accumulator circuit 203 can include an adder circuit. According to some aspects, power estimate accumulator circuit 203 can generate accumulated power estimate 204 from power estimates 222a-222n over one clock cycle. In some examples, accumulated power estimate 204 is an estimate of the power consumed by subsystems 103a-103n in one clock cycle. According to some aspects, peak power manager 101 is configured to receive the indicators, generate power estimates 222, and generate the accumulated power estimate 204 for each clock cycle.

According to some aspects, the generated accumulated power estimates for a plurality of clock cycles can be stored in storage device/circuit 205. In some examples, storage device 205 can include a FIFO storage device/circuit. However, storage device 205 can include other types of circuits. By using storage device 205, peak power manager 101 can store a plurality of accumulated power estimates over a plurality of clock cycles. In other words, storage device 205 can act as a moving window (a moving time interval window) for storing the plurality of accumulated power estimates over the plurality of clock cycles. In an example, storage device 205 can include an n-entry storage device (e.g., an n-entry FIFO storage device). In a non-limiting example, n-entry storage device 205 can be a 31-entry storage device. In some examples, a staging flip-flop can be arranged between power estimate accumulator circuit 203 and storage device 205.

As illustrated in FIG. 2, if storage device 205 is full (e.g., all entries of storage device 205 store the past n accumulated power estimates 204), when a current accumulated power estimate 204 is generated, the oldest accumulated power estimate 206 is removed from storage device 205. Additionally, peak power manager 101 can generate accumulated power estimate 210 over a plurality (e.g., n in the n-entry storage device example) of clock cycles. In this example, the oldest accumulated power estimate 206 is subtracted from the current (or the newest) accumulated power estimate 204 using adder circuit 207 to generate value 208. Value 208 is added to (using adder circuit 209) prior accumulated power estimate over clock cycles stored in memory 211 to generate the current accumulated power estimate 210 over clock cycles. According to some aspects, one or more of adder circuit 207, adder circuit 209, and memory 211 can be part of power estimate accumulator circuit 231. Power estimate accumulator circuit 231 is configured to generate accumulated power estimate 210 over the plurality of clock cycles corresponding to the moving time interval window.

In each clock cycle, accumulated power estimate 210 (accumulated over the past n clock cycles) is compared with threshold power 212 (e.g., an available budget). Threshold power 212 can be determined as discussed below with respect to FIGS. 3A-3C. Additionally, or alternatively, threshold power 212 can be stored in a memory (e.g., the DVFM table) to be retrieved by peak power manager 101. In some examples, threshold power 212 can be subsystem and/or state specific as the threshold can depend on voltage(s), frequenc(ies), number of cores, etc.

According to some aspects, peak power manager 101 can include control circuit 233. In some examples, control circuit 233 can include one or more comparators. For example, control circuit 233 can include one or more of comparator 213, comparator 217, and comparators 309a-309c of FIG. 3C. Additionally, or alternatively, control circuit 233 can perform operations of the one or more comparators (e.g., comparator 213, comparator 217, and/or comparators 309a-309c of FIG. 3C). According to some aspects, comparator 213 (e.g., a comparison circuit) compares accumulated power estimate 210 (accumulated over the past n clock cycles) with threshold power 212. If accumulated power estimate 210 satisfies a condition (e.g., accumulated power estimate 210 is greater than threshold power 212), control signal 214 is generated for limiting the number of instructions (e.g., high power instructions) being issued in subsystems 103. However, if accumulated power estimate 210 does not satisfy the condition (e.g., accumulated power estimate 210 is less than or equal to threshold power 212), peak power manager 101 does not generate control signal 214. In this example, peak power manager 101 does not limit the number of instructions (e.g., high power instructions) being issued in subsystems 103.

According to some aspects, control signal 120 (and/or control signal 214) can limit the number of instructions being issued in all of subsystems 103. For example, control signal 120 (and/or control signal 214) can block the instructions being issued in all of subsystems 103. Alternatively, control signal 120 (and/or control signal 214) can limit the number of instructions (e.g., block the instructions) being issued in one or more of subsystems 103. For example, peak power manager 101 can determine the one or more of subsystems 103 to send control signal 120 to them. In another example, peak power manager 101 can send control signal 120 to all of subsystems 103, and the one or more subsystems 103 can use control signal 120 to limit their instructions.

According to some aspects, peak power manager 101 can receive and/or retrieve one or more thresholds 216 from a memory (e.g., the DVFM table) to determine whether or not to pass control signal 214 to subsystems 103 to limit the number of instructions (e.g., high power instructions) being issued in subsystems 103. In some examples, threshold 216 can be subsystem and/or state specific as the threshold can depend on voltage(s), frequenc(ies), number of cores, etc. Threshold 216 can be a measure of whether a state is at risk of exceeding the peak power or not. For example, threshold 216 can indicate whether a state is a high performance state (e.g., subsystems 103a-130n with high amount of logic enabled), a medium performance state, or a low performance state (e.g., subsystems 103a-130n with low amount of logic enabled).

In this example, peak power manager 101 can also receive or retrieve one or more weights 218 that indicate information associated with the activity of one or more subsystems 103. For example, one or more weights 218 can be based on the number of agents that are on in one or more subsystems 103a-103n. In some examples, one or more weights 218 can change based on the activities of subsystems 103a-103n. In some examples, one or more weights 218 are stored in a memory (e.g., the DVFM table) and can be retrieved by peak power manager 101. Peak power manager 101 can compare one or more weights 218 with threshold 216 using comparator 217. The output of comparator 217 and comparator 213 are input to and circuit 215.

If one or more weights 218 satisfy a condition (e.g., one or more weights 218 are less than or equal to threshold 216), comparator 217 (e.g., a comparison circuit) can output logic "1" to and circuit 215. In this case, and circuit 215 can output control signal 120 to be the same as control signal 214. Therefore, peak power manager 101 can perform its peak power management techniques. If one or more weights 218 do not satisfy the condition (e.g., one or more weights 218 are greater than threshold 216), comparator 217 can output logic "0" to and circuit 215. In this case, and circuit 215 will not send any control signal 120 to limit the number of instructions being issued in subsystems 103. In this example, peak power manager 101 can first determine if subsystems 103 are at risk of exceeding a peak power or not before peak power manager 101 can perform its operation.

According to some aspects, the peak power management operations of peak power manager 101 can depend on the leakage consumption from threshold power 212 (e.g., the available budget). In other words, threshold power 212 can include a dynamic power component and a leakage consumption component. Given that peak power manager 101 is a relative power estimator for peak power management, the leakage consumption is also normalized, according to some aspects. In some examples, and as discussed in more detail below with respect to FIGS. 3A-3C, the leakage consumption can be quantized into one or more regions. In these examples, the leakage consumption can be computed based on leakage estimates derived from temperatures of subsystems 103 and classified using, for example, an m-level comparator. Threshold power 212 can then be determined based on the computed leakage consumption. According to some aspects, threshold powers 212 for different regions can be stored in a memory (e.g., the DVFM table) and can be a function of, for example, number of subsystems activated, voltage, frequency conditions, etc.

Figure 3A:
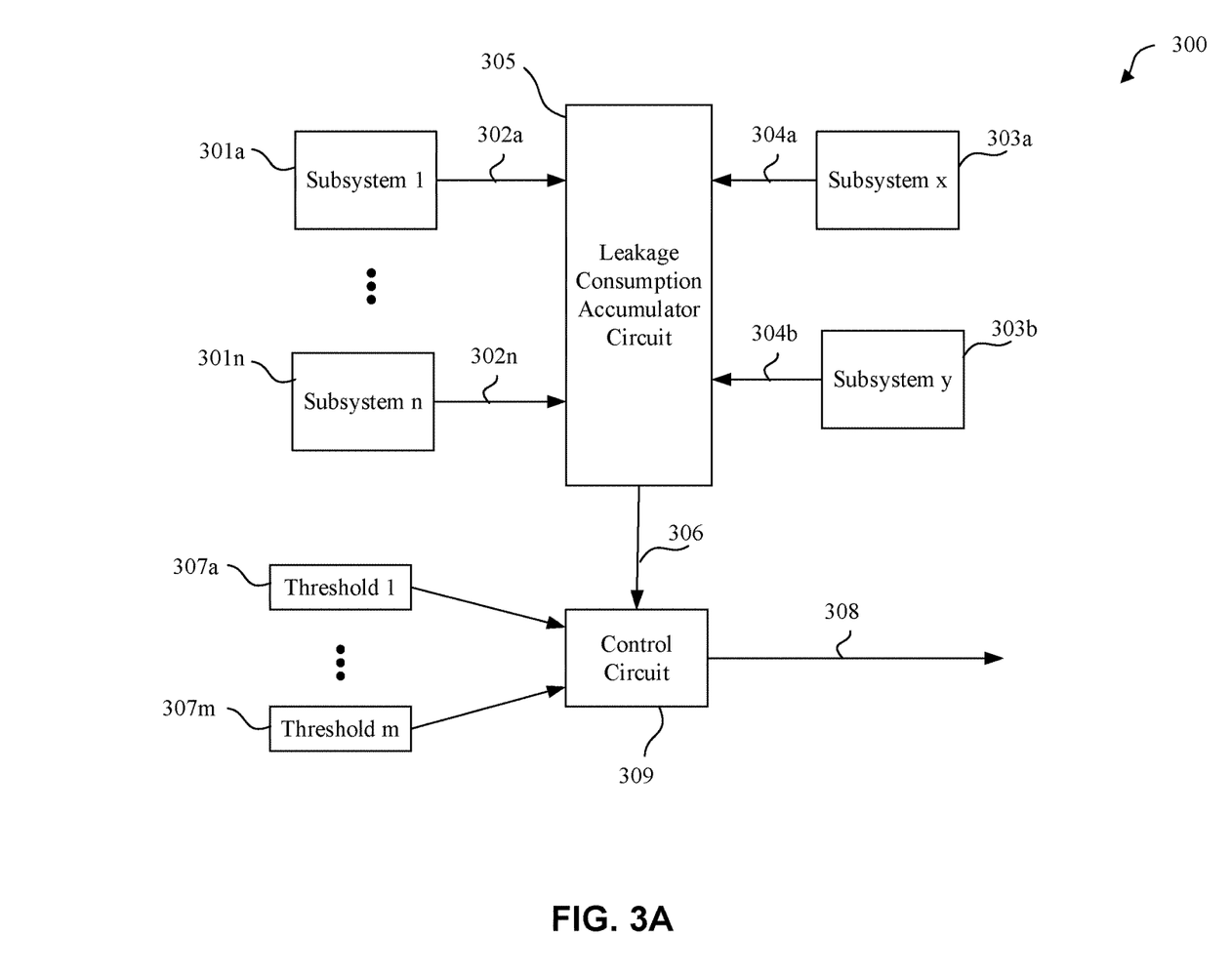
FIGS. 3A and 3B illustrate an exemplary leakage consumption determination system for use with the peak power manager, according to some aspects of the disclosure.
Figure 3B:
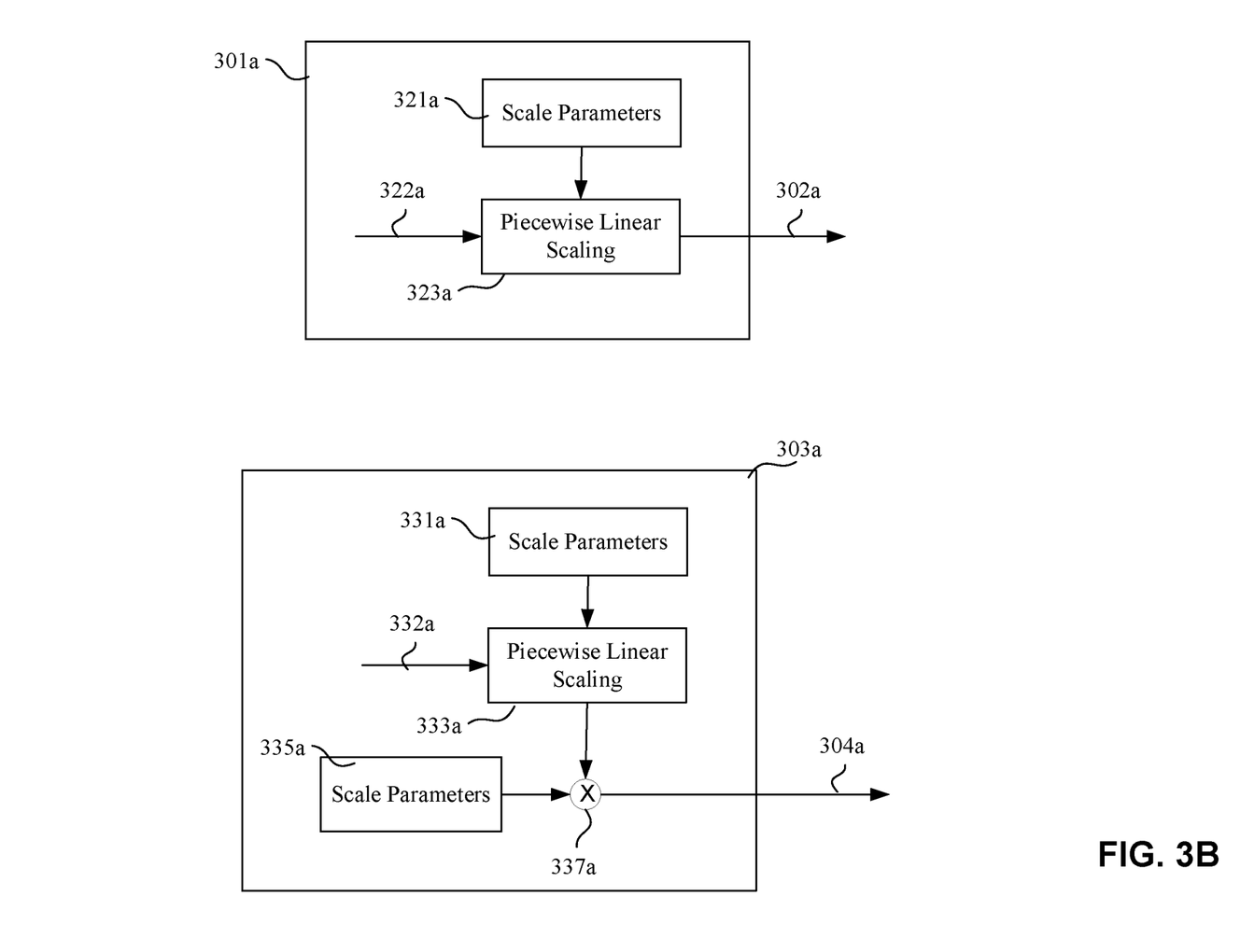

FIGS. 3A and 3B illustrate an exemplary leakage consumption determination system 300 for use with peak power manager 101, according to some aspects of the disclosure. Example system 300 is provided for the purpose of illustration only and does not limit the disclosed aspects. System 300 may include, but it not limited to, subsystems 301a-301n, subsystems 303a-303b, leakage consumption accumulator circuit 305 (e.g., an adder circuit), leakage thresholds 307a-307m, and control circuit 309. System 300 can include other and/or additional circuits. According to some aspects, system 300 is part of peak power manager 101 and/or is part of peak power manager 400 of FIG. 4.

According to some aspects, one or more of subsystems 301a-301n and subsystems 303a-303b can include one or more of subsystems 103a-103n of FIGS. 1 and 2. In some examples, subsystems 301a-301n can include one or more processors, processor cores, execution units, etc. In some examples, subsystems 303a-303b can include other aganets, memories such as caches, or other hardware and/or software components.

As discussed below with respect to FIG. 3B, the temperatures of subsystems 301a-301n and subsystems 303a-303b are measured and are used to determine leakage consumptions 302a-302n and 304a-304b. Leakage consumptions 302a-302n and 304a-304b are input to leakage consumption accumulator circuit 305. Leakage consumption accumulator circuit 305 accumulates leakage consumptions 302a-302n and 304a-304b to generate total leakage consumption 306. According to some aspects, leakage consumptions 302a-302n and 304a-304b and/or total leakage consumption 306 are scaled leakage consumptions.

Total leakage consumption 306 is compared, using control circuit 309, with one or more leakage thresholds 307a-307m to determine a leakage region and one or more parameters 308 for peak power manager 101. According to some aspects, control circuit 309 can include a comparator (e.g., a comparison circuit). In some examples, control circuit 309 can be control system 233 of FIG. 2 or be part of control system 233. Total leakage consumption 306 can be quantized into one or more regions using control circuit 309 and leakage thresholds 307a-307m. Different regions can have different parameters for peak power manager 101. Control circuit 309 can include an m-level comparator as discussed below with respect to FIG. 3C, according to some aspects. Control circuit 309 can classify total leakage consumption 306 into different regions and can select a leakage region and one or more parameters 308 for peak power manager 101. The selected leakage region can be used to determine parameters 308 of peak power manager 101 such as, but not limited to, threshold power 212 (e.g., the available budget) of FIG. 2. According to some aspects, leakage thresholds 307a-307m for different regions can be stored in a memory (e.g., the DVFM table) and can be a function of, for example, number of subsystems activated, voltage, frequency conditions, etc.

FIG. 3B illustrates an exemplary leakage consumption determination for two subsystems, according to some aspects of the disclosure. For example, FIG. 3B illustrates subsystem 301a that can include scale parameters 321a and piecewise linear scaling (PWL) circuit 323a. In this example, PWL 323a (e.g., a linear scaling circuit) can receive the measured temperature 322a of subsystem 301a and scale parameters 321a. Using these inputs, PWL circuit 323a can generate leakage consumption 302a. According to some aspects, leakage consumption 302a is a measure of the temperature of subsystem 301a that can be used by peak power manager 101. The aspects of this disclosure are not limited to PWL circuit 323a and can use other methods to generate leakage consumption 302a from the measured temperature of subsystem 301a. According to some aspects, leakage consumptions 302a-302n of subsystems 301a-301n can be determined similar to leakage consumption 302a discussed above. Leakage consumptions 302a-302n are relative values (e.g., relative to a maximum value). For example, leakage consumptions 302a-302n are numbers between 0 and 1.

In another example, FIG. 3B illustrates subsystem 303a that can include a first set of scale parameters 331a, a second set of scale parameters 335a, and piecewise linear scaling (PWL) circuit 333a. In this example, PWL circuit 333a (e.g., a linear scaling circuit) can receive the measured temperature 332a of subsystem 301a and the first set of scale parameters 331a. The output of PWL circuit 333a can be multiplied (using multiplier circuit 337a) by a second set of scale parameters 335a to generate leakage consumption 304a. According to some aspects, leakage consumption 304a is a measure of the temperature of subsystem 303a that can be used by peak power manager 101. The aspects of this disclosure are not limited to PWL circuit 333a and can use other methods to generate leakage consumption 304a from the measured temperature of subsystem 303a. According to some aspects, leakage consumptions 304b of subsystem 303b can be determined similar to leakage consumption 304a discussed above. Leakage consumptions 304a-304b are relative values (e.g., relative to a maximum value). For example, leakage consumptions 304a-304b are numbers between 0 and 1.

According to some aspects, leakage consumptions 302a-302n and 304a-304b can be determined for each state (e.g., current voltage, frequency, etc.) of subsystems 301a-301n and 303a-303b, respectively.

Figure 3C:
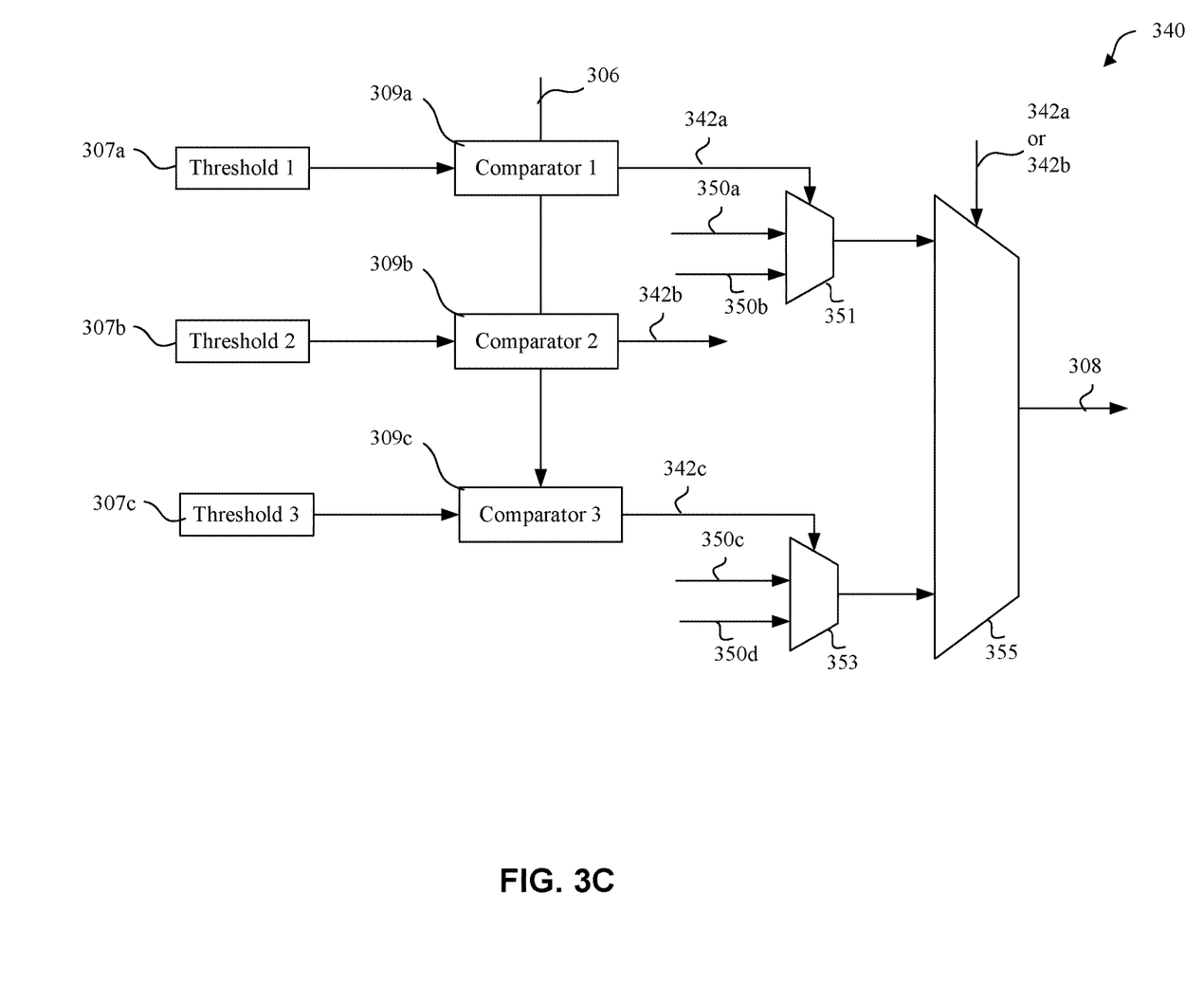
FIG. 3C illustrates an exemplary comparison system for selecting one or more parameters of the peak power manager, according to some aspects of this disclosure.

FIG. 3C illustrates an exemplary comparison system 340 for selecting one or more parameters of peak power manager 101, according to some aspects of this disclosure. Comparison system 340 (e.g., a comparison circuit) can be or include control circuit 309 of FIG. 3A, according to some examples. Comparison system 340 is discussed with respect to three leakage thresholds 307a-307c and therefore, four regions for selecting one or more parameters of peak power manager 101. However, the aspects of this disclosure are not limited to these example, and any number of thresholds and/or regions can be used.

As discussed above, leakage thresholds 307a-307c for different regions can be stored in a memory (e.g., the DVFM table) and can be a function of, for example, number of subsystems activated, voltage, frequency conditions, etc. Additionally, the memory (e.g., the DVFM table) can store parameters 350a-350d for each region for peak power manager 101. Comparison system 340 can use leakage thresholds 307a-307c to determine to which region total leakage consumption 306 belongs.

In one example, comparator 309a of comparison system 340 can compare total leakage consumption 306 with leakage threshold 307a and generate control signal 342a based on the comparison. Control signal 342a can control multiplexer 351 to select one of parameter(s) 350a or parameters 350b. Similarly, comparator 309b of comparison system 340 can compare total leakage consumption 306 with leakage threshold 307b and generate control signal 342b based on the comparison. Also, comparator 309c of comparison system 340 can compare total leakage consumption 306 with leakage threshold 307c and generate control signal 342c based on the comparison. Control signal 342c can control multiplexer 353 to select one of parameter(s) 350c or parameters 350d.

Control signals 342a or 342b can control multiplexer 355 to select one of the outputs of multiplexers 351 and 353 to output a leakage region and/or one or more parameters 308 for peak power manager 101. One or more parameters 308 can be threshold power 212 (e.g., an available budget) of FIG. 2. Additionally, or alternatively, threshold power 212 can be determined based on one or more parameters 308.

Figure 4:
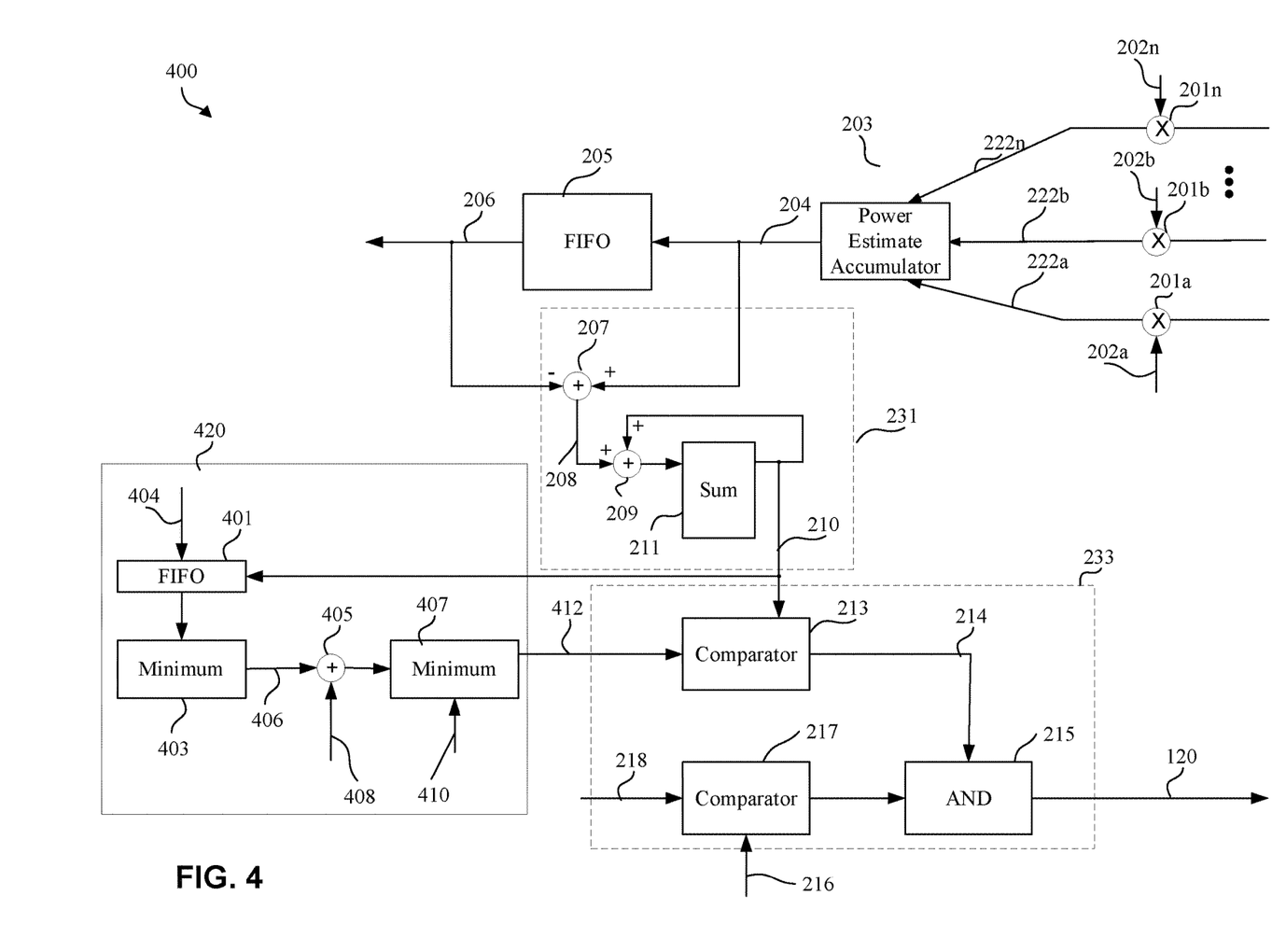
FIG. 4 illustrates an exemplary implementation of a peak power manager with preemptive mitigation, according to some aspects of the disclosure.

FIG. 4 illustrates an exemplary implementation of peak power manager 400 with preemptive mitigation circuit 420, according to some aspects of the disclosure. Peak power manager 400 is similar to peak power manager 101 of FIG. 2, and similar circuits/elements are referenced with same numerals and are not discussed in more detail with respect to FIG. 4. Peak power manager 400 can be used as peak power manager 101 of FIG. 1. One exemplary difference between peak power manager 400 and peak power manager 101 of FIG. 2 is the addition of preemptive mitigation circuit 420.

According to some aspects, threshold power 212 (e.g., the available budget) of FIG. 2 can be a parameter that can be determined as discussed above with respect to FIGS. 1 and 3A-3C. Additionally, or alternatively, threshold power 412 (e.g., the available budget) of FIG. 4 can be dynamically changed based at least on, for example, a present estimate of a current and how the estimate of the current is changing in time (e.g., di/dt (derivative of current (I(t)) with respect to time (t))). The estimate of the current can be based on threshold power 212 (e.g., the available budget) of FIG. 2.

According to some aspects, preemptive mitigation circuit 420 can be configured to determine a value of a maximum change in the estimate of the current (e.g., di/dt) allowed in the next m cycles (e.g., the size of m-entry FIFO storage device/circuit 401) and determine the present value of the estimate of the current (I(t)). In a non-limiting example, if the present value of the estimate of the current is at %20 and the maximum allowed change in the estimate of the current is %10 per cycle, then preemptive mitigation circuit 420 can determine that in the next n cycles, the value of the estimate of the current can only go up %50. Based on the determined value of maximum change in the estimate of the current (e.g., di/dt) allowed in the next m cycles and the present value of the estimate of the current, preemptive mitigation circuit 420 can set threshold power 412 (e.g., the available budget) of FIG. 4, according to some aspects.

In some examples, preemptive mitigation circuit 420 can include storage device 401 (e.g., an m-entry FIFO storage device) that receives accumulated power estimate 210. Storage device 401 can store accumulated power estimates 210 over a plurality (e.g., m) cycles. Minimum circuit 403 can be configured to determine a minimum value of accumulated power estimates 210 in storage device 401 and to generate minimum accumulated power estimate 406. Accumulator circuit 405 (e.g., an adder circuit) is configured to receive minimum accumulated power estimate 406 and add maximum allowed slew rate 408. According to some aspects, maximum allowed slew rate 408 can be retrieved from a memory (e.g., the DVFM table). In a non-limiting example, when at cycle n, the estimate of the of current is % x and the maximum estimate of the current allowed at cycle n+1 is % y, then maximum allowed slew rate 408 (e.g., the maximum allowed change in the estimate of the current (e.g., di/dt)) is y−x.

Minimum circuit 407 receives the output of accumulator circuit 405 and maximum allowed current 410 to determine threshold power 412 (e.g., the available budget). Minimum circuit 407 selects the minimum of the output of accumulator circuit 405 and maximum allowed current 410 to determine threshold power 412, according to some aspects. In some examples, maximum allowed current 410 can be based on threshold power 212 of FIG. 2 and/or parameter(s) 308 of FIGS. 3A-3C. In a non-limiting example, if maximum change in the estimate of the current (e.g., di/dt) is %105 but maximum allowed current 410 is %100, then preemptive mitigation circuit 420 chooses the one that is the most constraining of the two.

Therefore, preemptive mitigation circuit 420 can reduce the maximum change in the estimate of the current (e.g., di/dt), according to some aspects of this disclosure.

According to some aspects, preemptive mitigation circuit 420 can be enabled using IVDM (in-die voltage monitor) signal 404. For example, if system 400 determines that preemptive mitigation circuit 420 is to be enabled (e.g., there is a risk of an event such as, but not limited to, a voltage droop event), IVDM signal 404 can be used to enable operations of preemptive mitigation circuit 420. For example, if the system is at risk of reaching maximum change in the current (e.g., di/dt), IVDM signal 404 can enable preemptive mitigation circuit 420 to monitor di/dt and dynamically change the available budget. In some examples, IVDM signal 404 can reset storage device 401 (e.g., the m-entry FIFO). In other words, IVDM signal 404 is used to enable preemptive mitigation circuit 420 when there is a risk for, for example, subsystems 103a-103n.

According to some aspects, minimum circuits 403 and 405 can be part of a control circuit (e.g., control circuit 233). Additionally, or alternatively, minimum circuits 403 and 405 can be part of a second control circuit (e.g., different from control circuit 233).

Figure 5:
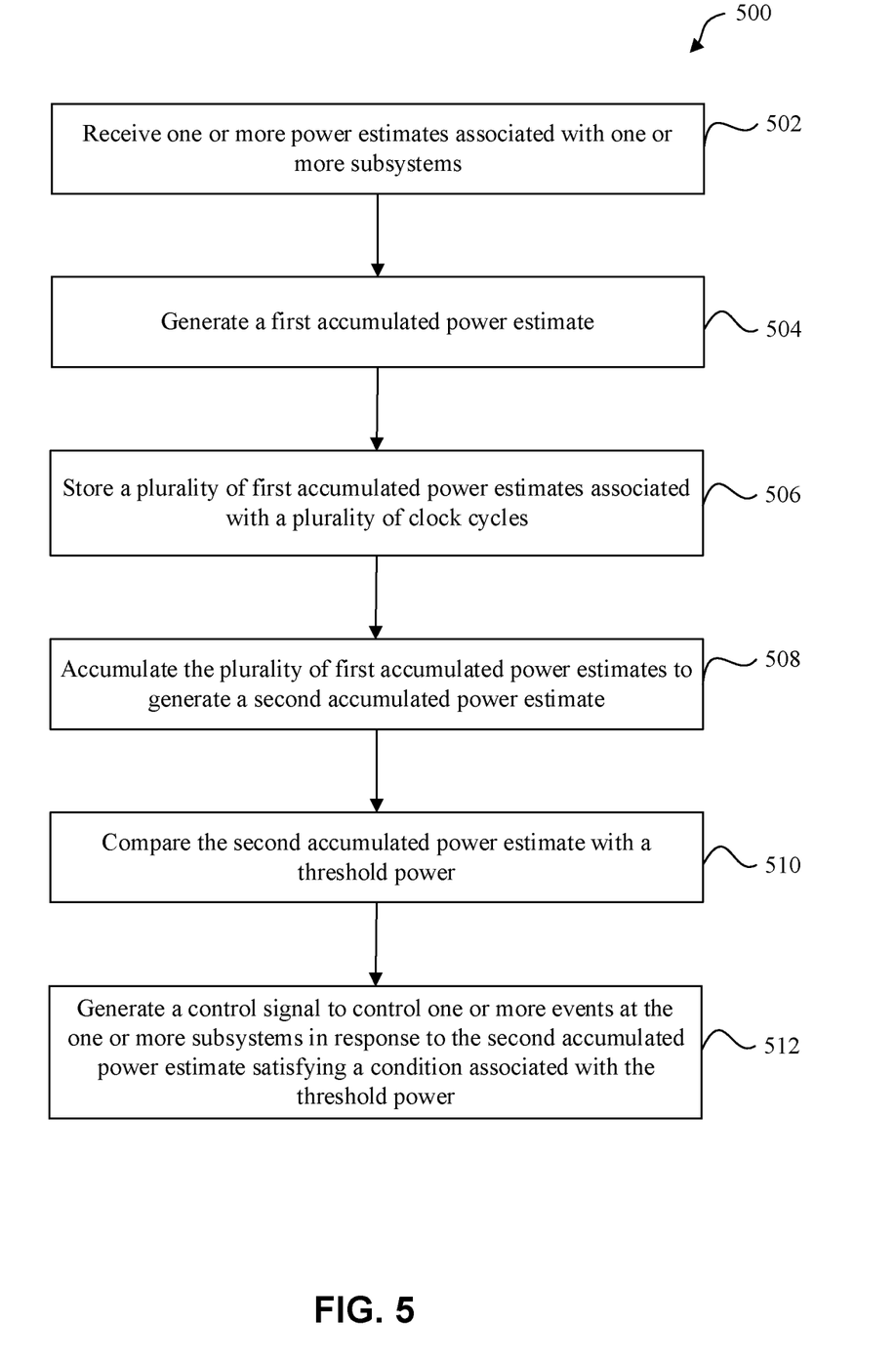
FIG. 5 illustrates an example method implementing peak power management, according to some aspects of the disclosure.

FIG. 5 illustrates an example method 500 implementing peak power management, according to some aspects of the disclosure. As a convenience and not a limitation, FIG. 5 may be described with regard to elements of FIGS. 1-4. Method 500 may represent the operation of an electronic device (e.g., peak power manager 101 of FIGS. 1 and 2 and/or peak power manager 400 of FIG. 4) implementing peak power management. Method 500 may also be performed by computer system 600 of FIG. 6. But method 500 is not limited to the specific aspects depicted in those figures and other systems may be used to perform the method as will be understood by those skilled in the art. It is to be appreciated that not all operations may be needed, and the operations may not be performed in the same order as shown in FIG. 5.

At 502, one or more power estimates are received. For example, a first power estimate accumulator circuit (e.g., power estimate accumulator circuit 203 of peak power manager 101 of FIG. 2) receives one or more power estimates that are associated with one or more sub systems (e.g., sub systems 103a-103n).

According to some examples, each power estimate can be generated based on a power indicator from a corresponding subsystem. For example, each one of one or more power indicators from subsystems 103a-103n can be multiplied by an associated weight (e.g., weights 202a-202n of FIG. 2) to generate the corresponding power estimate (e.g., power estimates 222a-222n). The power indicator can include information regarding the power consumed by subsystem 103. For example, as discussed above, the indicator can include, but is not limited to, the number of events such as, but not limited to, instructions (e.g., high power instructions) issued in each subsystem 103. Other methods can also be used to generate the power estimates. Also, although FIG. 2 illustrates a number of power estimates, the aspects of this disclosure can include any number (e.g., one or more) powers estimates used by peak power manager 101.

At 504, a first accumulated power estimate is generated. For example, the first power estimate accumulator circuit (e.g., power estimate accumulator circuit 203) can generate the first accumulated power estimate (e.g., accumulated power estimate 204) by adding the one or more power estimates (e.g., power estimates 222a-222n). In some examples, the first power estimate accumulator circuit is configured to generate the first accumulated power estimate from the one or more power estimates over one clock cycle.

At 506, a plurality of first accumulated power estimates associated with a plurality of clock cycles are stored. For example, a storage device (e.g., storage device 205 of FIG. 2) can store the plurality of first accumulated power estimates associated with the plurality of clock cycles corresponding to a moving time interval window. In some examples, the storage device can include a FIFO storage device. By using the storage device, the peak power manager of this disclosure can store a plurality of first accumulated power estimates over the plurality of clock cycles. The storage device can act as a moving window for storing the plurality of first accumulated power estimates over the plurality of clock cycles.

At 508, the plurality of first accumulated power estimates are accumulated to generate a second accumulated power estimate. For example, a second power estimate accumulator circuit (e.g., power estimate accumulator circuit 231 that can include one or more of adder circuits 207 and 209 and memory 211) can be configured to accumulate the plurality of first accumulated power estimates (e.g., power estimates in storage device 205) to generate a second accumulated power estimate (e.g., accumulated power estimate 210). In this examples, the second accumulated power estimate (e.g., accumulated power estimate 210) is a power estimate accumulated over one or more subsystems and over a plurality of clock cycles. In other words, the second power estimate accumulator circuit can be configured to accumulate the plurality of first accumulated power estimates over the plurality of clock cycles corresponding to the moving time interval window.

At 510, the second accumulated power estimate is compared with a threshold power. For example, a control circuit (e.g., control circuit 233 including comparator 213) can compare the second accumulated power estimate (e.g., accumulated power estimate 210) with the threshold power (e.g., threshold power 212).

According to some aspects, the threshold power (e.g., threshold power 212) can be stored in a memory (e.g., the DVFM table) and can be based on a performance state of the one or more subsystems. The control circuit (e.g., comparator 213) can retrieve the threshold power from the memory.

Additionally, or alternatively, one or more parameters of the peak power manager of this disclosure (e.g., the threshold power) can be determined based on leakage consumption of the one or more subsystems. In this example, method 500 can further include determining the one or more parameters of the peak power manager of this disclosure (e.g., the threshold power). For example, method 500 can further include receiving one or more leakage consumptions from the one or more subsystems and generate a total leakage consumption based on the one or more leakage consumptions. In this example, a leakage consumption accumulator circuit (e.g., leakage consumption accumulator circuit 305 of FIG. 3A) can be configured to receive one or more leakage consumptions (e.g., leakage consumptions 302a-302n and/or 304a-304b) from the one or more subsystems. The leakage consumption accumulator circuit can further generate a total leakage consumption (e.g., total leakage consumption 306) based on the received one or more leakage consumptions. According to some aspects, each of the one or more leakage consumptions is determined based on a temperature of a corresponding one of the one or more subsystems.

In this example, method 500 can further include comparing the total leakage consumption with one or more leakage thresholds and determining one or more parameters for the peak power manager based on the comparison. For example, as discussed in detail above with respect to FIGS. 3A-3C, control circuit 233 of FIG. 2 and/or a second control circuit (e.g., control circuit 309 including a comparator of FIGS. 3A and 3C) can be configured to compare the total leakage consumption (e.g., total leakage consumption 306) with one or more leakage thresholds (e.g., leakage thresholds 307a-307m). Based on the comparison, control circuit 233 of FIG. 2 and/or the second control circuit can be configured to determine one or more parameters for the peak power manager based on the comparison. The one or more parameters for the peak power manager can include the threshold power.

Additionally, or alternatively, method 500 can include dynamically generating the threshold power. For example, the peak power manager of this disclosure can include a preemptive mitigation circuit (e.g., preemptive mitigation circuit 420 of FIG. 4) configured to receive the second accumulated power estimate (e.g., accumulated power estimate 210) accumulated over the plurality of clock cycles and dynamically generate the threshold power.

In this example, method 500 can include receiving the second accumulated power estimate (e.g., accumulated power estimate 210) and storing the second accumulated power estimate in a storage device (e.g., storage device 401 of FIG. 4). Method 500 can further include determining, using a minimum circuit (e.g., minimum circuit 403), a minimum value of a plurality of second accumulated power estimates stored in the storage device. Method 500 can further include adding (using an accumulator circuit such as accumulator circuit 405 of FIG. 4) the determined/generated minimum accumulated power estimate (e.g., minimum accumulated power estimate 406 of FIG. 4) with a maximum allowed slew rate (e.g., maximum allowed slew rate 408 of FIG. 4) to generate an output. According to some aspects, maximum allowed slew rate can be retrieved from a memory (e.g., the DVFM table).

Method 500 can further include using the output of an accumulator circuit (e.g., accumulator circuit 405 such as an adder circuit) and a maximum allowed current (e.g., maximum allowed current 410 of FIG. 4) to determine the threshold power 412. For example, a minimum circuit (e.g., minimum circuit 407 of FIG. 4) selects the minimum of the output of the adder circuit and the maximum allowed current to determine the threshold power, according to some aspects.

Returning to FIG. 5 and after the comparison operation 510, if the second accumulated power estimate satisfies a condition associated with the threshold power, method 500 moves to 512 where a control signal is generated to control one or more events at the one or more subsystems. In some examples, the condition can include the second accumulated power estimate (e.g., accumulated power estimate 210) being greater than the threshold power (e.g., threshold power 212). In this example, if the second accumulated power estimate is greater than the threshold power, the control signal (e.g., control signal 214) is generated for limiting the number of events such as, but not limited to, instructions (e.g., high power instructions) being issued in subsystems 103. However, if the second accumulated power estimate (e.g., accumulated power estimate 210) satisfies a second condition (e.g., accumulated power estimate 210 is less than or equal to threshold power 212), the control signal (e.g., control signal 214) is not generated and/or is not sent to the subsystems.

According to some aspects, before determining the control signal and/or before sending the control signal to the one or more subsystems, method 500 can determine whether the one or more subsystems are at the risk of exceeding a peak power. If the one or more subsystems are not at risk, the control signal is not determined and/or is not sent to the one or more subsystem. In this example, method 500 can include receiving one or more weights and a threshold and comparing the one or more weights with the threshold. For example, a control circuit (e.g., control circuit 233 including, for example, comparator 217 of FIG. 2) can be configured to receive one or more weights (e.g., weights 218) and a threshold (e.g., threshold 216). The control circuit can be configured to compare the one or more weights with the threshold.

In response to the one or more weights satisfying a first condition associated with the threshold, method 500 can include passing the control signal to the one or more subsystems to control the one or more events (e.g., instructions, etc.) at the one or more subsystems. In some examples, the first condition can include the one or more weights being less than or equal to the threshold. However, in response to the one or more weights satisfying a second condition associated with the second threshold, method 500 can include blocking the control signal to the one or more subsystems. In some examples, the second condition can include the one or more weights being greater than the threshold 216.

Figure 6:
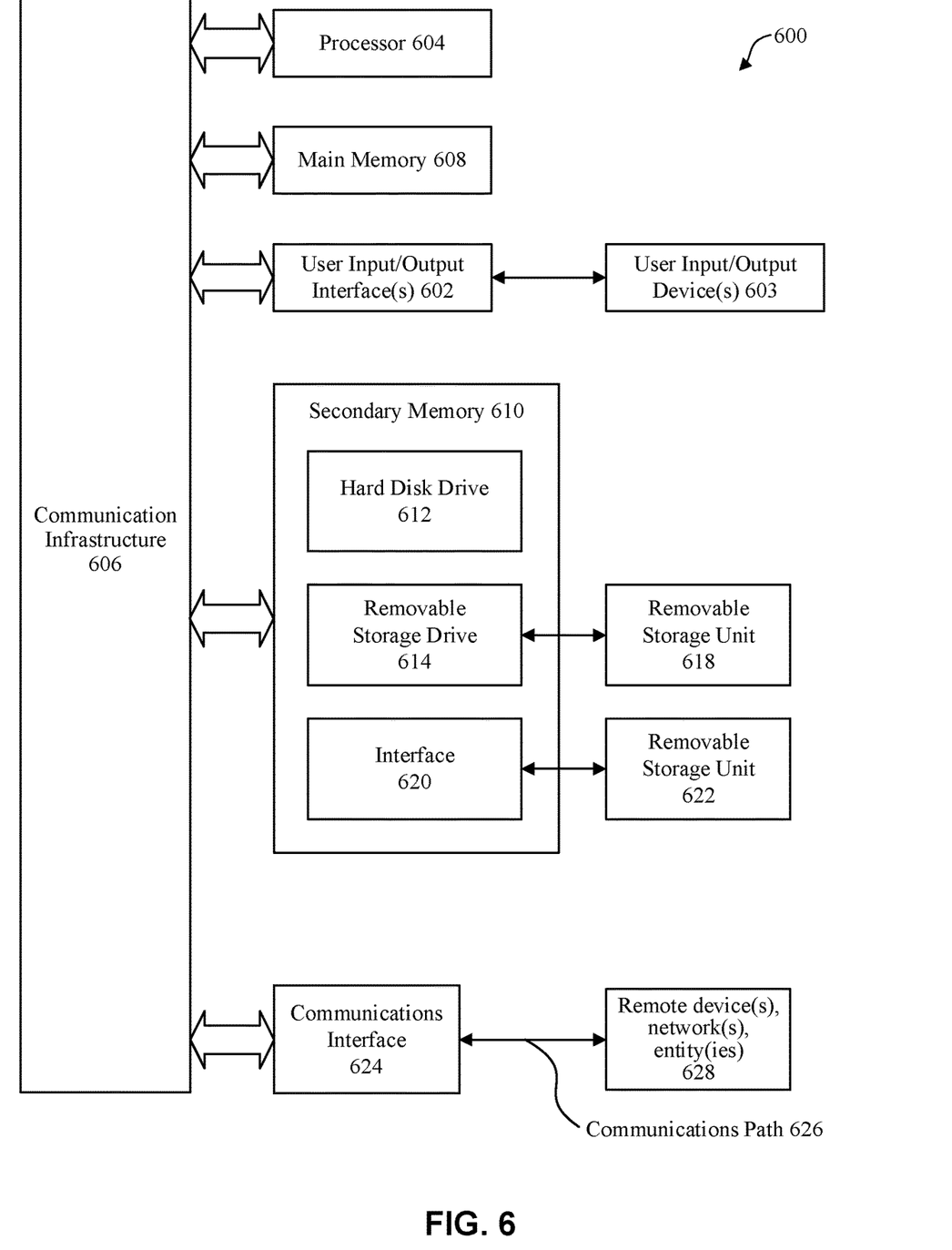
FIG. 6 illustrates an example computer system for implementing some aspects of the disclosure or portion(s) thereof.

Various aspects can be implemented, for example, using one or more computer systems, such as computer system 600 shown in FIG. 6. Computer system 600 can be capable of performing the functions described herein such as system 100 of FIG. 1, system 200 of FIG. 2, system 300 of FIG. 3A, and/or system 340 of FIG. 3C. Computer system 600 can be configured to perform method 500 of FIG. 5, according to some aspects. Computer system 600 includes one or more processors (also called central processing units, or CPUs), such as a processor 604. Processor 604 is connected to a communication infrastructure 606 (e.g., a bus.) Computer system 600 also includes user input/output device(s) 603, such as monitors, keyboards, pointing devices, etc., that communicate with communication infrastructure 606 through user input/output interface(s) 602. Computer system 600 also includes a main or primary memory 608, such as random access memory (RAM). Main memory 608 may include one or more levels of cache. Main memory 608 has stored therein control logic (e.g., computer software) and/or data.

Computer system 600 may also include one or more secondary storage devices or memory 610. Secondary memory 610 may include, for example, a hard disk drive 612 and/or a removable storage device or drive 614. Removable storage drive 614 may be a floppy disk drive, a magnetic tape drive, a compact disk drive, an optical storage device, tape backup device, and/or any other storage device/drive.

Removable storage drive 614 may interact with a removable storage unit 618. Removable storage unit 618 includes a computer usable or readable storage device having stored thereon computer software (control logic) and/or data. Removable storage unit 618 may be a floppy disk, magnetic tape, compact disk, DVD, optical storage disk, and/ any other computer data storage device. Removable storage drive 614 reads from and/or writes to removable storage unit 618 in a well-known manner.

According to some aspects, secondary memory 610 may include other means, instrumentalities or other approaches for allowing computer programs and/or other instructions and/or data to be accessed by computer system 600. Such means, instrumentalities or other approaches may include, for example, a removable storage unit 622 and an interface 620. Examples of the removable storage unit 622 and the interface 620 may include a program cartridge and cartridge interface (such as that found in video game devices), a removable memory chip (such as an EPROM or PROM) and associated socket, a memory stick and USB port, a memory card and associated memory card slot, and/or any other removable storage unit and associated interface.

Computer system 600 may further include a communication or network interface 624. Communication interface 624 enables computer system 600 to communicate and interact with any combination of remote devices, remote networks, remote entities, etc. (individually and collectively referenced by reference number 628). For example, communication interface 624 may allow computer system 600 to communicate with remote devices 628 over communications path 626, which may be wired and/or wireless, and which may include any combination of LANs, WANs, the Internet, etc. Control logic and/or data may be transmitted to and from computer system 600 via communication path 626.

The operations in the preceding aspects can be implemented in a wide variety of configurations and architectures. Therefore, some or all of the operations in the preceding aspects may be performed in hardware, in software or both. In some aspects, a tangible, non-transitory apparatus or article of manufacture includes a tangible, non-transitory computer useable or readable medium having control logic (software) stored thereon is also referred to herein as a computer program product or program storage device. This includes, but is not limited to, computer system 600, main memory 608, secondary memory 610 and removable storage units 618 and 622, as well as tangible articles of manufacture embodying any combination of the foregoing. Such control logic, when executed by one or more data processing devices (such as computer system 600), causes such data processing devices to operate as described herein.

Based on the teachings contained in this disclosure, it will be apparent to persons skilled in the relevant art(s) how to make and use aspects of the disclosure using data processing devices, computer systems and/or computer architectures other than that shown in FIG. 6. In particular, aspects may operate with software, hardware, and/or operating system implementations other than those described herein.

It is to be appreciated that the Detailed Description section, and not the Summary and Abstract sections, is intended to be used to interpret the claims. The Summary and Abstract sections may set forth one or more, but not all, exemplary aspects of the disclosure as contemplated by the inventor(s), and thus, are not intended to limit the disclosure or the appended claims in any way.

While the disclosure has been described herein with reference to exemplary aspects for exemplary fields and applications, it should be understood that the disclosure is not limited thereto. Other aspects and modifications thereto are possible, and are within the scope and spirit of the disclosure. For example, and without limiting the generality of this paragraph, aspects are not limited to the software, hardware, firmware, and/or entities illustrated in the figures and/or described herein. Further, aspects (whether or not explicitly described herein) have significant utility to fields and applications beyond the examples described herein.

Aspects have been described herein with the aid of functional building blocks illustrating the implementation of specified functions and relationships thereof. The boundaries of these functional building blocks have been arbitrarily defined herein for the convenience of the description. Alternate boundaries can be defined as long as the specified functions and relationships (or equivalents thereof) are appropriately performed. In addition, alternative aspects may perform functional blocks, steps, operations, methods, etc. using orderings different from those described herein.

References herein to "one aspect," "an aspect," "some aspects," "an example," "some examples" or similar phrases, indicate that the aspect described may include a particular feature, structure, or characteristic, but every aspect may not necessarily include the particular feature, structure, or characteristic. Moreover, such phrases are not necessarily referring to the same aspect. Further, when a particular feature, structure, or characteristic is described in connection with an aspect, it would be within the knowledge of persons skilled in the relevant art(s) to incorporate such feature, structure, or characteristic into other aspects whether or not explicitly mentioned or described herein.

The breadth and scope of the disclosure should not be limited by any of the above-described exemplary aspects, but should be defined only in accordance with the following claims and their equivalents.

As described above, aspects of the present technology may include the gathering and use of data available from various sources, e.g., to improve or enhance functionality. The present disclosure contemplates that in some instances, this gathered data may include personal information data that uniquely identifies or can be used to contact or locate a specific person. Such personal information data can include demographic data, location-based data, telephone numbers, email addresses, Twitter ID's, home addresses, data or records relating to a user's health or level of fitness (e.g., vital signs measurements, medication information, exercise information), date of birth, or any other identifying or personal information. The present disclosure recognizes that the use of such personal information data, in the present technology, may be used to the benefit of users.

The present disclosure contemplates that the entities responsible for the collection, analysis, disclosure, transfer, storage, or other use of such personal information data will comply with well-established privacy policies and/or privacy practices. In particular, such entities should implement and consistently use privacy policies and practices that are generally recognized as meeting or exceeding industry or governmental requirements for maintaining personal information data private and secure. Such policies should be easily accessible by users, and should be updated as the collection and/or use of data changes. Personal information from users should be collected for legitimate and reasonable uses of the entity and not shared or sold outside of those legitimate uses. Further, such collection/sharing should only occur after receiving the informed consent of the users. Additionally, such entities should consider taking any needed steps for safeguarding and securing access to such personal information data and ensuring that others with access to the personal information data adhere to their privacy policies and procedures. Further, such entities can subject themselves to evaluation by third parties to certify their adherence to widely accepted privacy policies and practices. In addition, policies and practices should be adapted for the particular types of personal information data being collected and/or accessed and adapted to applicable laws and standards, including jurisdiction-specific considerations. For instance, in the US, collection of, or access to, certain health data may be governed by federal and/or state laws, such as the Health Insurance Portability and Accountability Act (HIPAA); whereas health data in other countries may be subject to other regulations and policies and should be handled accordingly. Hence different privacy practices should be maintained for different personal data types in each country.

Despite the foregoing, the present disclosure also contemplates embodiments in which users selectively block the use of, or access to, personal information data. That is, the present disclosure contemplates that hardware and/or software elements can be provided to prevent or block access to such personal information data. For example, the present technology may be configurable to allow users to selectively "opt in" or "opt out" of participation in the collection of personal information data, e.g., during registration for services or anytime thereafter. In addition to providing "opt in" and "opt out" options, the present disclosure contemplates providing notifications relating to the access or use of personal information. For instance, a user may be notified upon downloading an app that their personal information data will be accessed and then reminded again just before personal information data is accessed by the app.

Moreover, it is the intent of the present disclosure that personal information data should be managed and handled in a way to minimize risks of unintentional or unauthorized access or use. Risk can be minimized by limiting the collection of data and deleting data once it is no longer needed. In addition, and when applicable, including in certain health related applications, data de-identification can be used to protect a user's privacy. De-identification may be facilitated, when appropriate, by removing specific identifiers (e.g., date of birth, etc.), controlling the amount or specificity of data stored (e.g., collecting location data a city level rather than at an address level), controlling how data is stored (e.g., aggregating data across users), and/or other methods.

Therefore, although the present disclosure may broadly cover use of personal information data to implement one or more various disclosed embodiments, the present disclosure also contemplates that the various embodiments can also be implemented without the need for accessing such personal information data. That is, the various embodiments of the present technology are not rendered inoperable due to the lack of all or a portion of such personal information data.

What is claimed is:

1. A peak power manager, comprising:
a first power estimate accumulator circuit configured to receive one or more power estimates associated with one or more subsystems and generate a first accumulated power estimate;
a first-in first-out (FIFO) storage circuit configured to store a plurality of first accumulated power estimates associated with a plurality of clock cycles corresponding to a moving time interval window;
a second power estimate accumulator circuit configured to accumulate the plurality of first accumulated power estimates to generate a second accumulated power estimate;
a control circuit configured to:
compare the second accumulated power estimate with a threshold power; and
generate a control signal to control one or more events at the one or more subsystems in response to the second accumulated power estimate satisfying a condition associated with the threshold power; and
a leakage consumption accumulator circuit configured to receive one or more leakage consumptions from the one or more subsystems and generate a total leakage consumption; and
a second control circuit configured to:
compare the total leakage consumption with one or more leakage thresholds, wherein the one or more leakage thresholds are based on a number of the one or more subsystems; and
determine the threshold power for the peak power manager based on the comparison.

2. The peak power manager of claim 1, wherein:
the first power estimate accumulator circuit is configured to generate the first accumulated power estimate from the one or more power estimates over a clock cycle, and
the second power estimate accumulator circuit is configured to accumulate the plurality of first accumulated power estimates over the plurality of clock cycles corresponding to the moving time interval window.

3. The peak power manager of claim 1, further comprising:
one or more multiplier circuits, wherein each of the one or more multipliers is configured to multiply each of one or more power indicators from a corresponding one of the one or more subsystems by a corresponding weight to generate a corresponding one of the one or more power estimates.

4. The peak power manager of claim 1, wherein the second control circuit is further configured to:
determine one or more parameters for the peak power manager based on the comparison.

5. The peak power manager of claim 4, wherein each of the one or more leakage consumptions is determined based on a temperature of a corresponding one of the one or more subsystems.

6. The peak power manager of claim 1, wherein the control circuit is further configured to:
receive one or more weights and a second threshold;
compare the one or more weights with the second threshold;
in response to the one or more weights satisfying a first condition associated with the second threshold, pass the control signal to the one or more subsystems to control the one or more events at the one or more subsystems; and
in response to the one or more weights satisfying a second condition associated with the second threshold, block the control signal to the one or more subsystems.

7. The peak power manager of claim 1, wherein the control circuit is configured to retrieve the threshold power from a memory and wherein the threshold power is based on a performance state of the one or more subsystems.

8. The peak power manager of claim 1, further comprising:
a preemptive mitigation circuit configured to receive the second accumulated power estimate accumulated over the plurality of clock cycles and dynamically generate the threshold power.

9. The peak power manager of claim 1, further comprising:
a preemptive mitigation circuit configured to receive the second accumulated power estimate accumulated over the plurality of clock cycles and dynamically generate the threshold power using a value of a maximum change in an estimate of a current allowed for one or more clock cycles and a present value of the estimate of the current.

10. A method, comprising:
receiving, by a first power estimate accumulator circuit of a peak power manager, one or more power estimates associated with one or more subsystems;
generating, by the first power estimate accumulator circuit, a first accumulated power estimate;
storing, using a first-in first-out (FIFO) storage circuit of the peak power manager, a plurality of first accumulated power estimates associated with a plurality of clock cycles corresponding to a moving time interval window;
accumulating, by a second power estimate accumulator circuit of the peak power manager, the plurality of first accumulated power estimates to generate a second accumulated power estimate;
comparing the second accumulated power estimate with a threshold power;
generating a control signal to control one or more events at the one or more subsystems in response to the second accumulated power estimate satisfying a condition associated with the threshold power;
receiving, by a leakage consumption accumulator circuit of the peak power manager, one or more leakage consumptions from the one or more subsystems;
generating, by the leakage consumption accumulator, a total leakage consumption;
comparing the total leakage consumption with one or more leakage thresholds, wherein the one or more leakage thresholds are based on a number of the one or more subsystems; and
determining the threshold power for the peak power manager based on the comparison.

11. The method of claim 10, wherein:
generating the first accumulated power estimate comprises accumulating the one or more power estimates over a clock cycle, and
generating the second accumulated power estimate comprises accumulating the plurality of first accumulated power estimates over the plurality of clock cycles corresponding to the moving time interval window.

12. The method of claim 10, further comprising:
multiplying, using one or more multiplier circuits of the peak power manager, each of one or more power indicators from a corresponding one of the one or more subsystems by a corresponding weight to generate a corresponding one of the one or more power estimates.

13. The method of claim 10, further comprising:
determining one or more parameters for the peak power manager based on the comparison.

14. The method of claim 13, wherein each of the one or more leakage consumptions is determined based on a temperature of a corresponding one of the one or more subsystems.

15. The method of claim 10, further comprising:
receiving one or more weights and a second threshold;
comparing the one or more weights with the second threshold;
in response to the one or more weights satisfying a first condition associated with the second threshold, passing the control signal to the one or more subsystems to control the one or more events at the one or more subsystems; and
in response to the one or more weights satisfying a second condition associated with the second threshold, blocking the control signal to the one or more subsystems.

16. The method of claim 10, further comprising:
retrieving the threshold power from a memory, wherein the threshold power is based on a performance state of the one or more subsystems.

17. The method of claim 10, further comprising:
receiving, by a preemptive mitigation circuit of the peak power manager, the second accumulated power estimate accumulated over the plurality of clock cycles; and
dynamically generating the threshold power.

18. A non-transitory computer-readable medium storing instructions that, when executed by a processor, cause the processor to perform operations comprising:
receiving one or more power estimates associated with one or more subsystems;
generating a first accumulated power estimate from the one or more power estimates over a clock cycle;
storing a plurality of first accumulated power estimates associated with a plurality of clock cycles corresponding to a moving time interval window;
accumulating the plurality of first accumulated power estimates to generate a second accumulated power estimate over the plurality of clock cycles corresponding to the moving time interval window;
comparing the second accumulated power estimate with a threshold power;
generating a control signal to control one or more events at the one or more subsystems in response to the second accumulated power estimate satisfying a condition associated with the threshold power;
receiving one or more leakage consumptions from the one or more subsystems;
generating a total leakage consumption;
comparing the total leakage consumption with one or more leakage thresholds, wherein the one or more leakage thresholds are based on a number of the one or more subsystems; and
determining the threshold power based on the comparison.

19. The non-transitory computer-readable medium of claim 18,
wherein each of the one or more leakage consumptions is determined based on a temperature of a corresponding one of the one or more subsystems.

20. The method of claim 10, further comprising:
receiving, by a preemptive mitigation circuit of the peak power manager, the second accumulated power estimate accumulated over the plurality of clock cycles; and
dynamically generating the threshold power using a value of a maximum change in an estimate of a current allowed for one or more clock cycles and a present value of the estimate of the current.

* * * * *